United States Patent Office 3,431,778
Patented Mar. 11, 1969

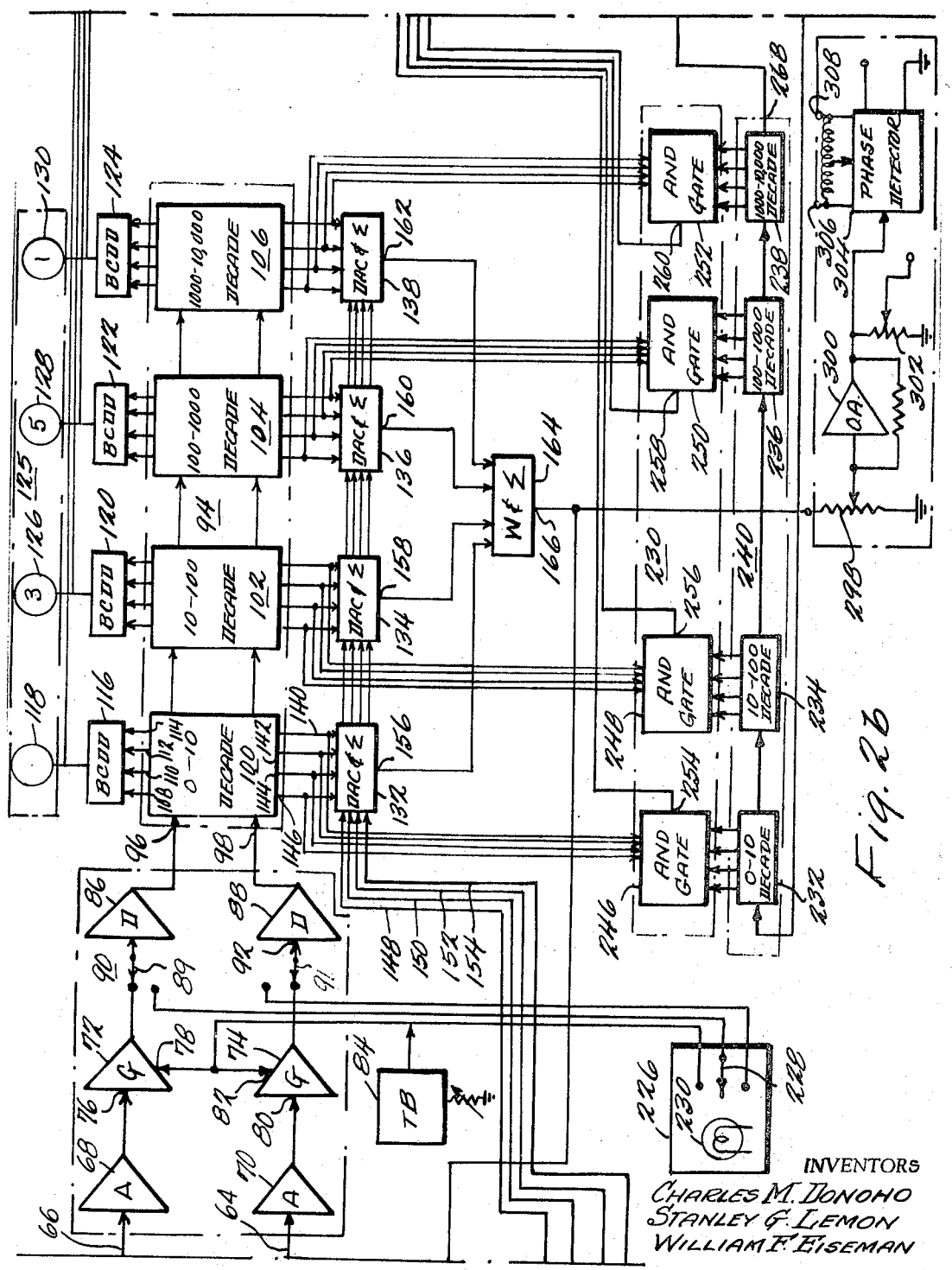

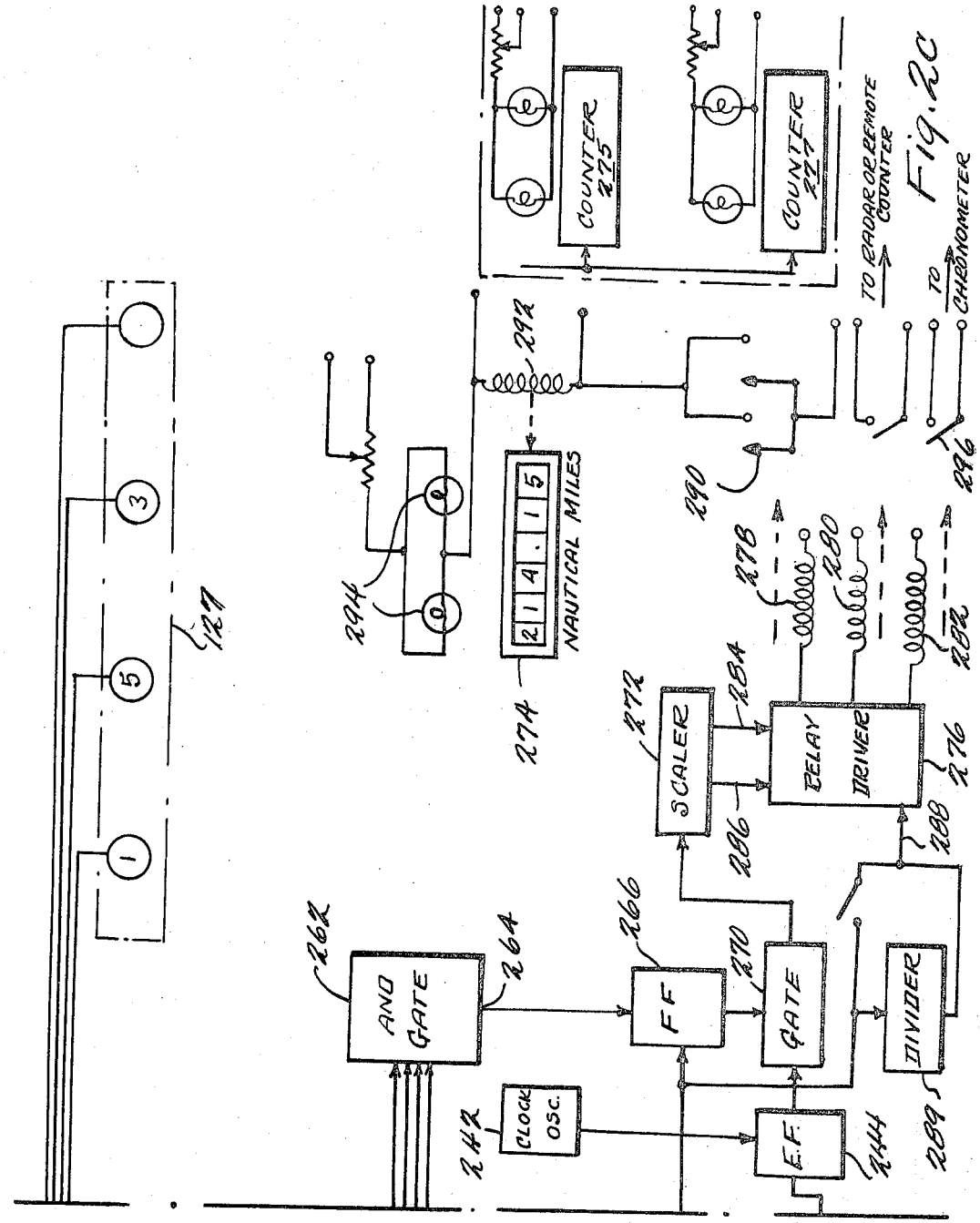

3,431,778
VELOCITY SENSING APPARATUS
Stanley G. Lemon, William F. Eiseman, and Charles M. Donoho, Annapolis, Md., assignors to Chesapeake Instrument Corporation, Shadyside, Md.
Continuation of application Ser. No. 459,708, May 28, 1965. This application Apr. 19, 1968, Ser. No. 722,806
U.S. Cl. 73—181                                                     14 Claims
Int. Cl. G01c *21/12*

ABSTRACT OF THE DISCLOSURE

The following specification discloses apparatus for the measurement of the velocity of a fluid medium. The low level alternating current from a rodmeter, which senses the velocity of the fluid, is voltage compared with a reference or response alternating current signal and the resulting error signal is converted in a phase comparator to a DC signal having a polarity dependent upon the phase of said error signal. The DC error signal, in conjunction with a clock pulse source, drive an up/down counter to provide a continuously updated indication of the velocity of the fluid medium. A digital-to-analog converter is provided to convert the counter output to an alternating current signal which constitutes the response signal and is fed back and compared with the signal from the rodmeter. A digital integrating apparatus is also provided to integrate speed indication of the up/down counter to provide a distance traveled or volume flow indication signal.

---

Figure 1:
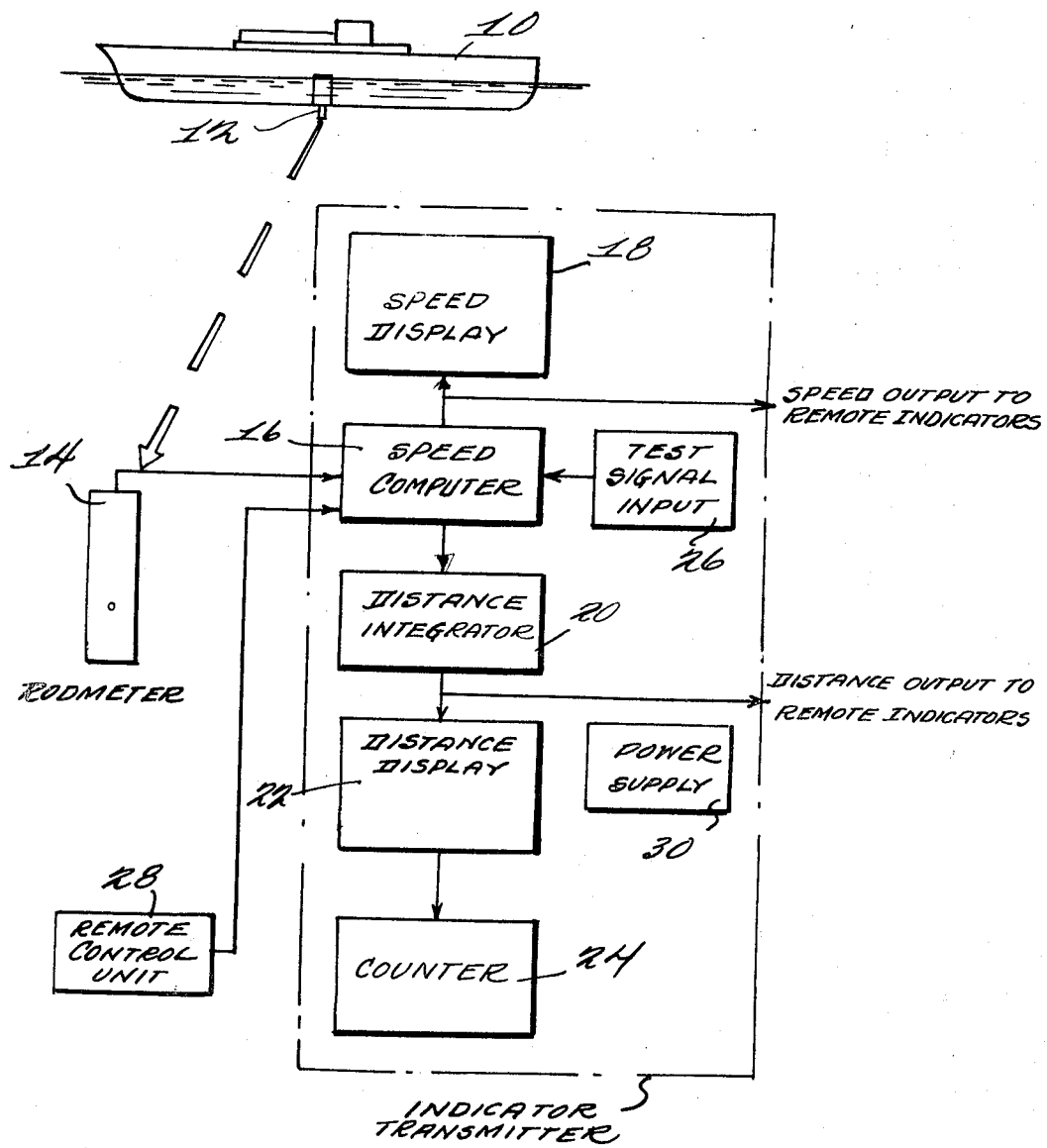

This invention is an improvement of that disclosed in the co-pending application Ser. No. 459,716, filed May 28, 1965 by Charles M. Donoho and now Patent No. 3,362,-220 assigned to the same assignee, to which reference may be made.

This is a continuation of Ser. No. 459,708 filed May 28, 1965, now abandoned.

The invention relates in general to apparatus which measures the velocity of water or some other fluid by sensing the flow of the water with respect to an electrical transducing device and also the invention relates to the circuitry necessary for accomplishing the measurement of this velocity; and, in particular, the invention relates to a completely transistorized apparatus for measuring the speed of the ship and for controlling devices which indicate the speed of the ship and the distance traveled by the ship.

In other approaches to the problem of determining ship's speed, a large amount of apparatus having moving parts is employed. Basically, this apparatus comprises servo-type devices which are used for various purposes. Because of the use of this apparatus, the speed determining mechanism is unusually heavy. This poses no particular problem with respect to large ships, both commercial and military; however, when the speed determining apparatus is used on ships or boats which cannot afford to carry heavy, unwieldy apparatus on board, use of the heavier apparatus obviously cannot be made.

In addition to decreasing the weight of the speed determining apparatus, by completely changing over all of the functions, which were once performed by servo mechanisms, to electric circuitry, the maintenance problem is also reduced to some extent.

Further, the expense of these speed determining devices or logs is also reduced thereby, making these devices more available to the general public. Another problem caused by the continuous operating servos is that their noise level is undesirably high.

Therefore, it is an object of this invention to provide a completely solid state transistorized speed determining apparatus for use in ships.

It is another object of this invention to provide a speed determining apparatus which is low in cost and weight.

Another object of this invention is to provide a quietly operating speed determining apparatus.

It is another object of this invention to provide a speed determining apparatus which is relatively easy to maintain.

An illustrative embodiment of the invention for achieving the above-mentioned objects will now be briefly described. The speed determining apparatus employs a sensing means (known as a rodmeter) which is located outside the hull of the ship, and which measures the velocity of the water with respect to the hull and therefore provides an indication of the ship's velocity. Rodmeters are well-known in the art and have been described in United States patents to Soller et al., 3,114,260, granted on Dec. 17, 1965 and to Snyder et al., 2,969,673, granted Jan. 31, 1961. Basically, these devices, in response to the flow of water by them, generate an electrical signal, the magnitude of which is representative of the velocity of water with respect to the ship, or conversely, the velocity of the ship with respect to the water.

Once the electric signal has been generated, it is fed to a voltage comparison device where it is compared with a reference or response signal. If there is a difference in magnitude between the reference signal and the sense signal, a counting means is actuated which:

(1) Changes the setting of a speed indicating device to conform the speed indication with the magnitude of the count in the counter and controls other devices which are responsive to the speed of the ship, and (2) Changes the magnitude of the reference or response signal to eliminate the difference in magnitude between the sense signal and the response signal.

The counting means is an up/down counter which is capable of counting up or down in response to input pulse trains applied respectively to an increase or a decrease terminal on the counter. When the speed of the ship increases, the contents of the counter increase to correspond with the speed increase; and when the ship's speed decreases, the contents of the counter correspondingly decrease. The output of the counter is converted to an analogue voltage which is representative of the speed of the ship and which develops the reference or response signal which is compared with the sense signal from the rodmeter. This digital representation of the current speed indication, as contained in the counter, may also be used in other parts of the ship where a digital representation of the ship's speed is desired.

All electric solid state means are employed to utilize the counter setting for controlling speed indicating means and distance indicating means. The distance converting means basically comprises another counter which is driven by a local oscillator clock and which has its contents continuously compared with the first-mentioned counter to derive a signal which is representative of the distance traveled of the ship.

Figure 2A:
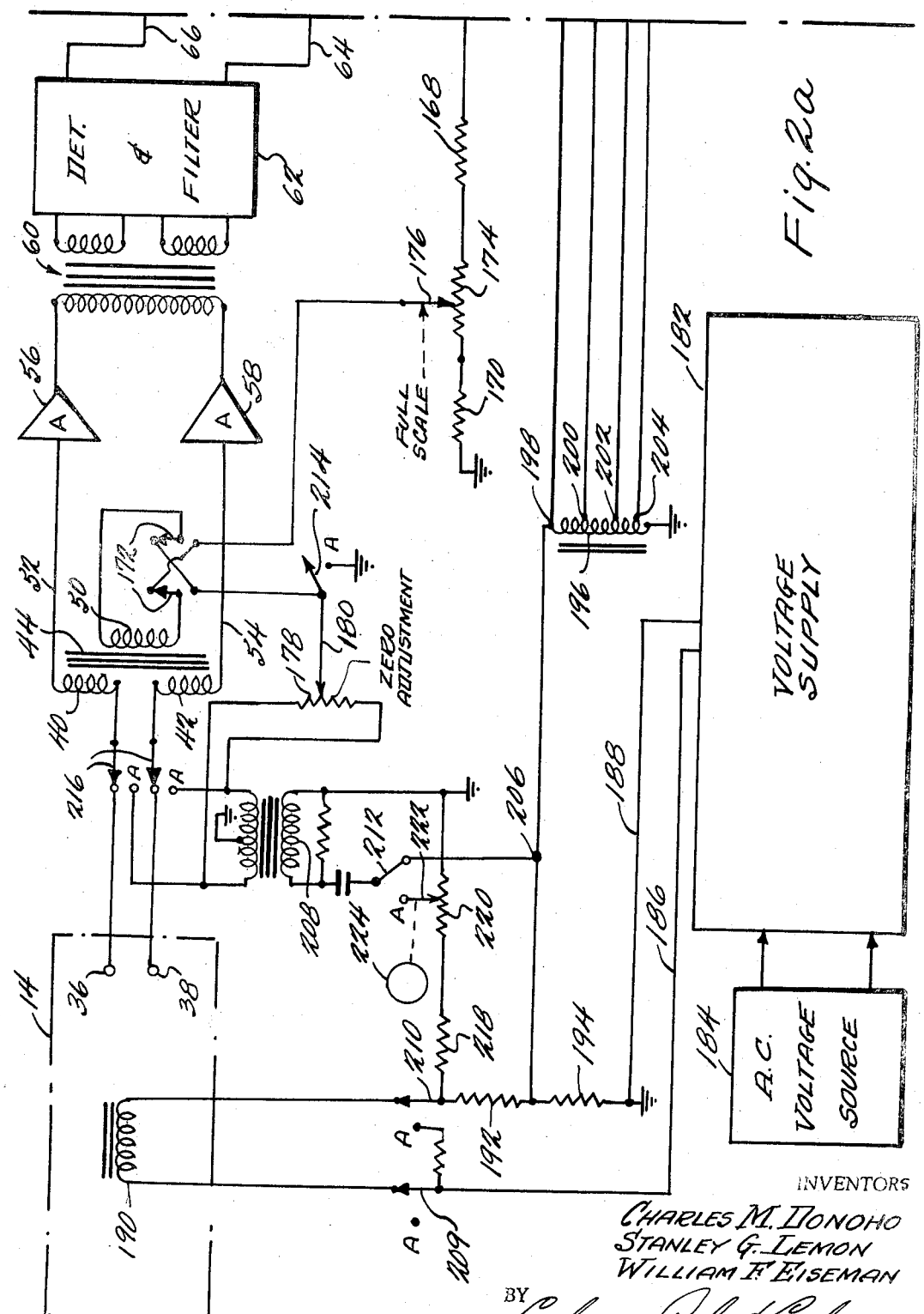

In order to better understand the invention, there will now be given a description of an illustrative embodiment of the invention in conjunction with the accompanying drawings where:

FIGURE 1 diagram represents the entire system for determining the speed of the ship; and FIGURE 2 is a combination block and schematic diagram of the speed determining apparatus or computer, where FIGURE 2 comprises FIGURES 2a, 2b and 2c; FIGURE 2b is an extension to the right of FIGURE 2a and FIGURE 2c is an extension to the right of FIGURE 2b.

Referring to FIGURE 1, the entire system, also known as an underwater log system, consists of the following component groups:

(1) The ship 10 has a rodmeter 12 which is inserted through the hull; the rodmeter is blown up as indicated at 14 (the rodmeter 14 produces an AC signal proportional to the ship's speed with respect to the water);

(2) The speed computer 16 is controlled by the rodmeter signal and it produces input signals to control the speed display 18, the distance indicators 20, and the output signals to the remote speed indicators 20, and the output signals to the remote speed indicators;

(3) The integrator 20 converts the speed signals into output pulses proportional to the distance traveled;

(4) The distance unit 22 receives the pulse output from the integrator 20 and drives a counter 24 and produces output pulse as required, for example, by a true motion radar;

(5) Test signals circuit 26 performs no function in normal equipment operation, but provides signals that can be used in checking the functioning of the system;

(6) The remote control unit 28, when the system is in dummy lock operation, makes it possible to set the speed display 18 from a remote location; and (7) Power supply 30 furnishes DC voltages to the electrical circuit in the equipment.

Referring now to FIGURE 2, there is shown the rodmeter 14. The electrical signal generated by the rodmeter is developed across terminals 36 and 38. This signal is developed across secondary windings 40 and 42 of transformer 44 when the contacts 216 are in their normally closed positions. The response or reference voltage which is compared against the magnitude of the sense signal from the rodmeter 14 is developed across the secondary winding 50 of input transformer 44.

Whenever the reference signal and the sense signal are equal in magnitude, zero error signal will be developed on wires 52 and 54. The response voltage and the sense voltage add algebraically within transformer 44, the algebraic sum of these two signals being the error voltage. If the ship's speed should increase, the algebraic sum of the voltages would produce an error signal in phase with the speed or sense signal. If the ship's speed should decrease, the resulting error signal will be 180° out of phase with the speed or sense signal. An error signal in phase with the speed signal will drive the speed computer 16 in the increasing speed direction or cause it to count up, while an error signal 180° out of phase will drive the speed computer in the decreasing direction or cause it to count down.

When an error signal is developed across wires 52 and 54, it is amplified in amplifiers 56 and 58 which are differentially connected and which therefore provide high common mode rejection. For more details of an amplifier arrangement, including pre-amplifier and post-amplifier, which is suitable for use within the blocks 56 and 58, reference may be made to the above-mentioned co-pending application.

The outputs from amplifiers 56 and 58 are fed to a transformer 60 which supplies the error signal to a phase detector and filters 62. The phase detector of blocks 62 may basically comprise a full wave balanced modulator for converting the AC error voltage into a DC voltage and for eliminating quadulature components which are introduced into the error signal for miscellaneous reasons. The filtering network at the output of the balanced modulator may be a pair of RC and parallel T combinations for smoothing a pair of rectified voltages. The amplitude of these rectified voltages is proportional to the magnitude of rodmeter sense signal and the phase corresponds to the phase of error signal. The filtering network also insures that a proper compromise is made between slow and fast response time of the speed computer to changes in the ship's speed. An extremely slow response time cannot be tolerated because it must be known within a fairly short time what the actual speed of the ship is after the change in speed occurs. Also, an extremely fast response time cannot be tolerated since the speed computer would become responsive to every slight movement of the ship with respect to the water and would therefore not necessarily indicate the ship's true speed. For a more detailed explanation of the phase detector and filters which may be used in block 62, reference should be made to the above-mentioned co-pending application.

At the output terminals 64 and 66, of the phase detector 62, two DC voltages are present. When the voltage at terminal 64 is up, the speed of the ship may be increasing, for example, and the voltage at terminal 66 will be down. If the speed of the ship is decreasing, the voltage at terminal 66 will be up, for example, and the voltage at terminal 64 will be down.

The DC voltages on terminals 64 and 66 are amplified respectively in DC amplifiers 68 and 70, which introduce gain into the error signals which it was not possible to do in the amplifiers 56 and 58. The reason for this is that if the error signal were amplified too much at amplifiers 56 and 58, the transistors therein would saturate. However, this has been avoided by limiting the amplification introduced by amplifiers 56 and 58 to avoid such transistors' saturation. DC amplifiers appropriate for use in this invention are described in detail in the co-pending application.

AND gates 72 and 74 may respectively comprise a pair of diodes as shown in the above-mentioned co-pending application. The input terminals to the AND gate 72 are 76 and 78, and the input terminals to the AND gate 74 are 80 and 82.

Time base 84 is a source of rectangular pulses which may comprise a relaxation oscillator, together with switching means for changing the frequency of the oscillator in accordance with the response desired of the system to changes in the ship's speed. The co-pending application may be referred to for a detailed description of a time base which is suitable for delivering rectangular pulses at a rate which may be varied in accordance with the needs of the particular situation. The output from time base 84 is connected to the input terminals 78 and 82 of AND gates 72 and 74, respectively. The AND gates pass pulses from the time base 84 through the gates with an amplitude which is governed by the voltage levels on terminals 76 and 80, respectively.

Threshold detectors 86 and 88 are provided to discriminate against pulse trains, the voltage levels of which do not attain value at the input of the respective threshold detectors. For example, if the voltage level of the signals appearing at terminal 90 is in excess of the threshold setting for threshold detector 86, then the voltage level of the signals appearing at input terminal 92 of threshold detector 88 will be below the threshold setting of threshold detector 88. Therefore, threshold detector 86 will pass pulses, whereas threshold detector 88 will not. When there is no error signal present at terminals 52 and 54, the voltage levels of the pulses respectively appearing at terminals 90 and 92 will be the same and neither of the threshold detectors will permit passage of pulses, the reason for this being that it is desirable to establish a "dead zone" during which no response is made by the speed computer 16 to changes in the ship's motion with respect to the water. This dead zone may be .02 knot and may correspond to 0.5 volt of the threshold setting of the threshold detectors 86 and 88. For example, if both of the voltage levels of the pulses at terminals 90 and 92 are at 6 volts when there is no error signal at terminals 52 and 54, then the voltage level at one of the terminals 90 or 92 must exceed 6.5 volts before one of the threshold detectors 86 or 88 will permit passage of a pulse train. This, of course, presumes that the threshold settings at the detectors 86 and 88 are set at 6.5 volts. The threshold detectors 86 and 88 may be Schmit triggers as described in the copending application.

An up/down counter, generally indicated at 94, is provided to establish an indication of the speed of the ship. This counter is able to count up or count down, depending on whether the input pulses are respectively applied at counter input terminals 96 and 98. The counter is preferably of the binary-coded-decimal (BCD) type where each block 100 through 106 respectively represents a digit or a decade of the count. Block 100 represents the 0–10 decade, block 102 represents the 10–100 decade, block 104 represents the 100–1000 decade, and block 106 represents the 1000–10,000 decade.

Various BCD up/down or up only counters are presently available; however, the basic features of a BCD counter contemplated by the invention will now be described. Binary-coded-decimal representation is used for each of the decades. This means that each decade or digit is represented by four binary numbers, the first of which corresponds to a 1, the second of which corresponds to a 2, the third of which corresponds to a 4 and the fourth of which corresponds to an 8. By appropriately combining each of the binary numbers corresponding to 1, 2 and 4 would for instance, to obtain the digit "7" in the block 100, the binary numbers corresponding to 1, 2 and 4 would be turned on.

Each of the blocks 100–106 comprises a pair of interconnected flip-flops for representing the four states required for binary-coded-decimal (BCD) representation. Four wires 108, 110, 112 and 114 are shown connected to block 100. Each of these connections is respectively connected to one of the four states of the block 100. A BCD converter 116 is also connected to the four wires 108–114 extending from block 100. The BCD converter converts the BCD representation of the digit in block 100 to a voltage level which is suitable for actuating a display 118 which visually displays the digit contained within the block 100. BCD converters 120–124 and display means 126–130 respectively decode and display the digits contained within the blocks 102–106 of the up/down counter 94. Blocks 100–106 comprise a visual display 125. This visual display may also be remotely located from the speed computer 16 as shown at 127.

Thus, there has been described means for representing the speed of the ship by utilizing the count within the up/down counter 94 to represent the ship's speed. The block 106 represents the highest digit of the speed representation. In other words, if the up/down counter 94 is employed to represent speeds up to 99.99 knots, the tens digit would occur in block 106. Preferably, the decimal point would occur between blocks 104 and 102 and the provision of display light 118 would be optional since the indication of speed to the nearest 100th of a mile ordinarily is not necessary. It is impotrant to note that counter 94 makes possible the easy representation of speeds up to 100 knots, whereas with prior devices, 40 knots is usually the maximum speed expressible.

The contents of the up/down counter 94 are also employed to generate an analogue signal which corresponds to the speed of the ship and which is used to balance out the sense signal from the rodmeter whenever there is difference between the magnitude of the rodmeter sense signal and the response or reference voltage fed back from the counter output to the input transformer 44.

The analogue-to-digital converters and summers 132–138 are respectively connected to the blocks 100–106 of up/down counter 94. Various analogue-to-digital convertors are presently available; however, the basic features of an analogue-to-digital convertor and summer contemplated by the invention will now be described. Each of the convertors 132–138 is connected through four wires 140–146 to each of the four states of the blocks 102–106. Note the connections between block 100 and convertor 132. Within the digital analogue convertor, there may be four gates which are conditioned respectively by the four outputs from each of the blocks 100–106. Also connected to each of the convertors 132–138 (for example, see convertor 132) are four analogue voltages. These voltages are connected at terminals 148, 150, 152, and 154 and are respectively 8, 4, 2, and 1 volt lines. Each of the connections 148–154 is respectively connected to the four gates within the convertor. The 8-volt analogue signal is connected by the gate conditioned by the binary state corresponding to 8 in the up/down counter 100. The 4-volt analogue signal is connected to the gate conditioned by the binary state corresponding to 4 in the block 100, etc. In this manner the four gates within the convertor 132 pass analogue signals which correspond to the respective binary states which are turned on in the up/down counter 100.

A summing network is also incorporated into block 132 which sums the analogue voltages passed by the four gates within the convertor and thereby develops an analogue signal at the output terminal 156 which is representative of the BCD digit stored in block 100 of up/down counter 94. Convertors for summers 134–138 operate in exactly the same fashion as convertor 132 to generate analogue voltages corresponding to the BCD representations in blocks 102–106, respectively.

The above analogue voltages developed at the outputs 156–162 are fed to a weighting and summing network 164. Each of the analogue outputs from the convertors 156–162 is weighted in accordance with the significance of its value. In other words, the analogue signal from block 162 is accorded the most weight and therefore is not attentuated or divided by the weighting network within block 164. However, the analogue voltage at terminal 160 must be accorded $\frac{1}{10}$ of the weight of the analogue voltage at 162 since it represents a digit in the decade one below the decade represented by block 106. Therefore, the weighting network divides the analogue signal at terminal 160 by 10 and accordingly the analogue signals at terminals 158 and 156 are respectively divided by 100 and 1000. After each of the analogue outputs at terminals 156–162 has been weighted, they are summed in a registor network, for example, and outputted at output terminal 166 of the weighting and summing network 164. Other means may also be used for developing a count and translating it to an analogue voltage—for example, the stepping switches employed in telephone exchange.

The analogue voltage 166 is a representation of the speed of the ship and is used to derive the reference signal which is applied to primary winding 50 of input transformer 44. This voltage is applied through a voltage divider comprising resistor 168 and resistor 170. The voltage developed across the voltage divider is then fed through switch 172 to the primary 50 of input transformer 44. A full scale adjustment is provided for calibrating the voltage divider when the ship is operating at the maximum speed that can be indicated by the up/down counter 94. The setting on potentiometer 174 provides this full scale adjustment. In other words, the wiper 176 of potentiometer 174 is adjusted until the voltage developed across primary 50 corresponds to the true maximum speed of the particular ship that the speed computer 16 is being employed upon.

A zero adjustment is also provided to cancel out any signals which are introduced across terminals 52 and 54 when the ship is not moving. In other words, due to stray pickup voltages, an error signal can be introduced across terminals 52 and 54 when he ship is not moving. The purpose of the zero adjustment circuitry is to insure that this extraneous error signal is cancelled out. A zero adjustment potentiometer 178 provides the source of the voltage necessary to cancel out the extraneous error signal. By adjusting the wiper 180 of potentiometer 178, a signal is introduced into the primary winding 50 of input transformer 44 which cancels out the extraneous error signal.

Voltage supply 182 is utilized to supply the AC and DC operating and biasing voltages for the various electronic circuits used throughout the speed computer 16. This supply is energized by AC power source 184. An AC signal is developed across terminals 186 and 188 for exciting the rodmeter coil 190 and for developing a voltage across resistors 192 and 194.

The voltage developed across 194 is fed to the auto transformer 196 where analogue voltages are tapped off at taps 198-204. These analogue voltages are used to drive the digital-to-analogue convertors and summers 132-138 as described before.

A voltage is also tapped from resistor 194 at terminal 206 which is fed through the primary winding 208 of transformer 210 to the secondary winding 212 and then across resistor 178 to develop the necessary zero adjustment voltage.

The voltage developed across resistors 192 and 194 is used for test purposes. In other words, it is sometimes desirable to develop a test signal which simulates the sense signal developed by the rodmeter 14 for maintenance purposes. This can be accomplished by switching switches 208-216 from the positions shown in the drawing to their other positions. The switching of switch 208 removes the excitation voltage developed across wires 186 and 188 from the rodmeter coil 190. The switching of switch 210 switches in a 70 ohm load to the wires 186 and 188 to replace the impedance of the coil 190 of the rodmeter. The switching of switch 212 permits the test voltage to be applied to the primary 208 of the transformer 210. The switching of switch 216 permits the application of the test voltage applied across primary 208 to the secondary windings 40 and 42 of input transformer 44 and also the operation of switch 216 prevents any input voltage from being applied from the rodmeter pickup terminals 36 and 38. The switching of switch 214 prevents any zero adjustment of voltage from being applied to the primary winding 50. All of the contacts of switches 208-216 may be under the control of one relay (not shown).

Whenever the test mode is desired, the switches 208-216 are transferred, as described above. This causes the application of voltage across resistor 218 and potentiometer 220. The wiper 222 of the potentiometer 220 is controlled by a manual switch 224 which has graduated thereon speed settings which can be inserted into the speed computer 16. If the manual switch is set, for example, to 35 knots, the wiper 222 would be so positioned as to cause the generation of a voltage which corresponds to 35 knots for the ship. This voltage is developed across primary 208 of transformer 210 and then is transferred to secondary windings 40 and 42 of input transformer 44. The rest of the speed computer 16 should operate in its normal fashion as if the rodmeter 14 were developing the signal.

A further capability provided in the speed computer 16 allows for remote control setting of the speed indicators 125. The remote control unit is shown at block 226 and comprises simply a spring loaded switch 228 which at its center position is off and which in its upper position causes connection of the time base 84 to the increase input terminal 90 of threshold detector 86, and which in its lower position causes connection of the time base 84 to the decrease input terminal 92 of threshold detector 88. Therefore, whenever it is desired to set the speed indicator 125 with an estimated speed because the calculated speed derived from the rodmeter sense signal is unavailable, an opeartor at a remote location (for instance, the engine room) can merely depress a switch in either the increase or decrease direction and cause a speed indicator, which would also be remotely located at his location, to change until there is a correspondence between the speed indicator and his estimated speed. A red light 230 is also provided at the remote control units 226 to let the operator know that the speed computer 16 is under remote control operation or is operating as a dummy log.

Means for electrically determining the distance traveled by the ship is also available in the present invention. This further illustrates the contrast between the present invention and the prior art where servo motors and mechanical linkages were employed to provide the distance determination and indication. The outputs from each of the blocks 100-106 of up/down counter 94 are also connected to a BCD comparator 230. Various BCD comparators are presently available; however, the basic features of a BCD counter contemplated by the invention will now be described. The comparator 230 is also connected to the blocks 232-238 of an up counter 240. The up counter 240 is driven by a crystal clock oscillator 242 through emitter-follower 244. The crystal clock oscillator preferably operates at $10^6$ cycles per second. The first stage of up counter 240 is block 232 which contains a binary-coded decimal representation of the 0-10 decade; block 234 contains a BCD representation of the 10-100 decade; block 236 contains a BCD representation of the 100-1000 decade and block 238 contains a BCD representation of the 1000-10,000 decade. The manner in which each of these blocks represent binary-coded-decimal numbers is exactly the same as that of blocks 100-106. The only difference betwen the counters 94 and 240 is that counter 94 is an up/down counter whereas counter 240 counts up only.

The comparator 230 comprises AND gates 246-252. Each of these AND gates is respectively connected between the blocks 100-106 and the blocks 232-238. As the clock oscillator 242 drives the counter 240, the count registered by counter 240 increases by one with each output pulse from clock 242. Eventually, the count contained within block 240 equals the count contained within the counter 94 and at this time the output terminals 254-260 of blocks 246-252 are all conditioned on and actuate AND gate 262 to turn on the output terminal 264 and thereby transfer the state of flip-flop 266.

Each time 10,000 pulses, for example, are emitted from the clock 242, an output pulse occurs at output terminal 268 of counter 240. This output pulse transfers flip-flop 266 thereby conditioning gate 270 to pass output pulses from clock 242 through the emitter-follower 244 to the scaler 272. The pulses from clock 242 will continue to be passed by gate 240 until the count within counter 240 equals the count within counter 94. At this instant, all four outputs 252-260 of comparator 230 will be turned on, thereby transferring flip-flop 266 as described before. The transfer of flip-flop 266 turns gate 270 off thereby preventing any further passage of pulses from clock 242 to scaler 272.

It can now be seen that the number of pulses passed by gate 270 within a given time interval is a function of the count contained within counter 94 or the speed of the ship; and therefore, the number of pulses passed in a given time instant is determinative or indicative of the distance traveled by the ship within the given time interval. For example, if the setting of the counter 94 were 2500 and the the clock frequency was $10^6$ cycles per second, 2500 pulses would be passed through gate 270 every 100th of a second. However, if the count contained by counter 94 were 5,000, then 5,000 pulses would be passed by the gate 270 every 100th of a second. Thus, it can be seen that means have been described for determining the distance traveled by a ship in accordance with the count contained within the counter 94.

The scaler 272 divides the number of pulses emitted by the gate 72 to a number which is suitable for driving a counter 274. For example, if the clock frequency is $10^6$ cycles per second, and the scaler would divide the number of pulses coming out of gate 270 by 360,000, the output from the scaler 272 would be a pulse representative 0.01 nautical mile of distance traveled from the last scaler pulse output.

Relay driver 276 is actuated by the pulses from the scaler 272 and drives the relays 278, 280 and 282. The inputs 284, 286 and 288 respectively correspond to the relays 278–282. Each time relay 278 is energized, it actuates a switch 290 which closes the energizing circuit for the coil 292 for the counter 274. Neon bulb indicators 294 are also provided for illuminating the dial of the counter 274.

If it is desired to drive a chronometer on shipboard, a source of timing pulses is readily available from the output 268 of counter 240. If the clock frequency is $10^6$ cycles per second, pulses occur at terminal 268 every 100th of a second and these may be delivered to terminal 288 to drive the energizing relay 282 of contact 296 of a chronometer (not shown). Divider 289 is also provided to provide pulses every 10th of a second if so desired.

Also, if it is desirable to have an analogue representation of the ship's speed somewhere on board, for navigational computation, this is available at output terminal 166 of weighting and summing network 164. This analogue voltage may be fed to potentiometer 298, where a signal is developed for driving operational amplifier 300. The AC output from amplifier 300 is developed across potentiometer 302 where an AC voltage representing 0.1 volt per knot may be available. If it is desired to generate 0.1 volt per knot, DC, for example, a phase detector 304 is provided which rectifies the AC voltage at the output of amplifier 300. A reference voltage is applied across the terminals 306 and 308 for developing the DC voltage.

Although the invention has been basically described with respect to an electromagnetic log for measuring the speed of a ship with respect to water it is traveling in, it will be obvious to one skilled in this art that the invention is applicable to any situation where it is desirable to measure relative velocity between a fluid and a sensor, such as the velocity of a liquid flowing in a pipe where the sensor generates an electrical signal in response to the said relative velocity. It will also be obvious to one skilled in the art that this invention is applicable where the sensor may employ other principles than that of Faraday's Law to generate the said electrical signal.

Further, the preceding description of the invention has been directed to apparatus for measuring the distance traveled by a ship. The basic method for determining the distance is to integrate the velocity measurement with respect to time. However, this method would also be employed to determine the mass flow of a liquid through a pipe—that is, integration of the liquid velocity with respect to time will result in an indication representative of mass flow.

The scaler means connected to the integrator output as described hereinbefore basically functions to make the distance units appropriate for driving the distance indicating device. However, when the integrator is being employed as mass flow meter, the purpose of the scaler is to multiply the output of the integrator by some constant which is a function of the density of the fluid and the cross-sectional area of said bounding medium and thereby obtain a mass flow determination.

Another desirable feature of the integration means of this invention rests in the fact that samples of the relative velocity indication are taken at very short intervals of time thereby insuring that the integration calculation is extremely accurate. For example, the clock oscillator preferably runs at $10^6$ c.p.s. Since the maximum count that can be contained in the counters is $10^4$, this means that 100 samples are taken of the relative velocity setting every second.

A further explanation of the scaling function with respect to distance determination will now be given. Suppose that the ship is traveling at 25 knots. If the distance indicating device requires 100 pulses for stepping the device one nautical mile, then it is necessary that it receive 2500 pulses every 100th second when the speed is 25 2500/3600 pulses per second. However, the gate 270 passes 2500 pulses every 100th second when the speed is 25 knots or 250,000 pulses every second. Therefore, it is necessary to divide or scale the output from gate 270 by 360,000 in order to insure that the counter 274 receives 25/36 pulses per second or 2500 pulses per hour. This, of course, assumes that counter 274 requires 100 pulses to register a nautical mile.

Other counters 275 and 277 for distance indicating may be driven by the scaler. If one of these counters requires, for example, 200 pulses per nautical mile, then the scaler 272 would be tapped from a point 286 which would scale by 180,000.

Remote speed indicator, indicated at 127, is also available for display of the speed indication.

Although the invention has been described with respect to an illustrative embodiment, the embodiment is not intended to be restrictive. Further, many modifications will occur to one skilled in the art and therefore it is intended that the invention be limited only by the appended claims.

What is claimed is:

1. Apparatus for measuring the relative velocity of a fluid with respect to a sensor, said apparatus being of the type which employs the said sensor to generate an alternating current sense signal in response to the said relative velocity of the fluid with respect to the sensor where the sense voltage is employed to control a velocity indicating device, said apparatus comprising:
    counter means for registering a count and controlling the setting of said velocity indicating device,
    converter means for converting said count to an alternating current analog response signal, which is a measure of said relative velocity,
    means for generating a first and second drive signal, said counter means being responsive to said first drive signal for increasing the count registered by said counter and to said second drive signal for decreasing the count in said counter,
    means responsive to the difference in magnitude between said sense and response signals for generating a first error signal having a first polarity when said sense signal is greater than said response signal and a second error signal having a polarity opposite to said first error signal when said response signal is greater than said sense signal, and
    first and second gating means respectively responsive to said first and second error signals for respectively gating said first and second drive signals.

2. Apparatus for measuring the relative velocity of fluid with respect to a sensor, said apparatus being of the type which employs the said sensor to generate an alternating current sense signal in response to the said relative velocity of the fluid with respect to the sensor where the sense voltage is employed to control a velocity indicating device, said apparatus comprising:
    first means for registering a count, said first means controlling the setting of said velocity indicating device,
    a digital-to-analog converter responsive to the count registered by said counter for generating an alternating analog voltage indicative of said relative velocity and a voltage divider responsive to said analog voltage for providing a response signal, said voltage divider including a potentiometer for providing a full speed adjustment to said response signal,
    means responsive to the difference in magnitude of said sense signal and said response signal for generating an error signal when said difference exists; and
    means responsive to said error signal for generating a drive signal for said first means.

3. Apparatus for measuring the relative velocity of a fluid with respect to a sensor, said apparatus being of the type which employs the said sensor to generate an alternating current sense signal in response to the said relative velocity of the fluid with respect to the sensor where the sense voltage is employed to control a velocity indicating device, said apparatus comprising:
   first means for registering a count, second means for converting said count to an alternating current analog response signal, which is a measure of said relative velocity, said first means controlling the setting of said velocity indicating device,
   means responsive to the difference in magnitude of said sense signal and said response signal for generating an error signal when said difference exists;
   means responsive to said error signal for generating a drive signal for said first means, and
   means for checking the function of said apparatus including means for disconnecting said sensor from said means responsive to the difference in magnitude of said sense signal and said response signal and for connecting thereto a test signal whose magnitude simulates the magnitude of a sense signal.

4. Apparatus for measuring the relative velocity of a fluid with respect to a sensor, said apparatus being of the type which employs the said sensor to generate an alternating current sense signal in response to the said relative velocity of the fluid with respect to the sensor where the sense voltage is employed to control a velocity indicating device, said apparatus comprising:
   first means for registering a count, second means for converting said count to an alternating current analog response signal, which is a measure of said relative velocity, said first means controlling the setting of said velocity indicating device,
   means responsive to the difference in magnitude of said sense signal and said response signal for generating an error signal when said difference exists;
   means responsive to said error signal for generating a drive signal for said first means, and
   means for integrating the said relative velocity with respect to time and for indicating the result of said integration on an indicating device including:
   oscillator means for generating a train of pulses,
   second counter means responsive to said oscillator means for continuously and cyclically counting the number of output pulses from said oscillator means, said second counter means including means for generating an output signal each time the count in said second counter reaches the maximum count registrable therein,
   comparator means for comparing the counts registered by said first and second counter and for generating an output each time the count in said first and second counter means are equal,
   gating means for passing the train of pulses from said oscillator means to said indicating device, and
   control means responsive to the output from said second counter for conditioning said gating means to pass the pulses from said oscillator to said indicating device and to the output from said comparator means to condition said gating means to prevent the passage of pulses from said oscillator means to said indicating device, the number of pulses received by said indicating device being representative of the said integration with respect to time.

5. Apparatus for measuring the relative velocity of a fluid with respect to a sensor, said apparatus being of the type which employs a source of alternating current for energizing said sensor to generate an alternating current sense signal of the same frequency in response to the said relative velocity of the fluid with respect to the sensor where the sense signal is employed to control a velocity indicating device, said apparatus comprising:
   first counter means for registering a count, said first counter means controlling the setting of said velocity indicating device,
   means connected to said source of alternating current for generating a plurality of alternating current reference signals having binary related amplitudes,
   a digital-to-analog converter responsive to the count registered by said first counter means for selectively attenuating said plurality of reference signals to provide an alternating analog voltage indicative of said relative velocity,
   means responsive to the difference in magnitude of said sense signal and said response signal for generating an error signal when said difference exists, and
   means responsive to said error signal for generating a drive signal for said first counter means.

6. Apparatus as in claim 1 including means for setting the velocity indicating device from a location remote from said counter means, said setting means including means for switching the said first and second drive signals directly to said counter means.

7. The apparatus of claim 1 wherein said first and second gating means further comprises first and second threshold means respectively for preventing the gating of said first and second drive signals whenever said first and second said error signals are below a predetermined level.

8. Apparatus as in claim 4 for measuring the distance traveled by a ship including scaling means responsive to the output pulses passed by said gating means for making the distance units appropriate for driving the indicating device.

9. Apparatus as in claim 4 for measuring the mass flow rate of a fluid through a bounded medium including scaling means responsive to the output pulses passed by said gating means for multiplying the result of said integration by a constant which is a function of the density of the fluid and the cross-sectional area of said bounded medium.

10. Apparatus as in claim 4 where said oscillator means runs at not less than $10^6$ cycles per second thereby insuring that a large number of samples of said relative velocity are obtained every second.

11. Apparatus for digitally integrating an analog signal with respect to time comprising:
   a first counter having stored therein a count continuously corresponding to the magnitude of said analog signal,
   oscillator means for generating a train of pulses,
   second counter means responsive to said oscillator means for continuously and cyclically counting the number of output pulses from said oscillator means, said second counter means including means for generating an output signal each time the count in said second counter reaches the maximum count registrable therein,
   comparator means for comparing the counts registered by said first and second counter and for generating an output each time the count in said first and second counter means are equal,
   gating means for selectively passing the train of pulses from said oscillator, and
   control means responsive to the output from said second counter for conditioning said gating means to pass the pulses from said oscillator and to the output from said comparator means to condition said gating means to prevent the passage of pulses from said oscillator means, the number of pulses passed by said gating means thereby being representative of the said integration of said analog signal with respect to time.

12. The apparatus of claim 11 wherein said first counter comprises a plurality of stages and said second counter comprises a plurality of stages identical to those of said first counter, the number of said stages in said second counter being at least sufficient to contain a count equal to or greater than the maximum value of said analog signal.

13. The apparatus of claim 11 further comprising means responsive to the pulses passed by said gating means for providing an output which is proportional to the number of said pulses passed by said gating means.

14. Apparatus for digitally integrating an analog signal with respect to time comprising:
   a first counter having stored therein a count continuously corresponding to the magnitude of said analog signal,
   oscillator means for generating a train of pulses,
   second counter means responsive to said oscillator means for continuously and cyclically counting the number of output pulses from said oscillator means,
   comparator means for comparing the counts registered by said first and second counter,
   a flip-flop adapted to be set when said second counter reaches its maximum value and reset when said comparator senses an equal count in said first and second counters and a pulse gate means connected to said flip-flop and said oscillator, said pulse gate being adapted to pass the output from said oscillator when said flip-flop is set, and to block said oscillator output when said flip-flop is reset, the number of pulses passed by said gating means being representative of the said integration with respect to time.

References Cited

UNITED STATES PATENTS

| | | | |
|---|---|---|---|
| 2,715,717 | 8/1955 | Keithley et al. | 340—4 |
| 2,836,356 | 5/1958 | Forrest et al. | 235—61 |
| 2,932,471 | 4/1960 | Exner et al. | 244—77 |
| 3,042,911 | 7/1962 | Paradise et al. | 340—347 |
| 3,063,018 | 11/1962 | Gordon et al. | 328—147 |
| 3,108,266 | 10/1963 | Gordon et al. | 340—347 |
| 3,114,260 | 12/1963 | Soller et al. | 73—181 |
| 3,189,891 | 6/1965 | Karsh | 340—347 |
| 3,261,012 | 7/1966 | Bentley | 340—347 |
| 3,362,220 | 1/1968 | Donoho | 73—181 |

LOUIS R. PRINCE, *Primary Examiner.*

D. O. WOODIEL, *Assistant Examiner.*

U.S. Cl. X.R.

73—194; 235—150.2